Feb. 26, 1963   H. GOLDE   3,079,196
MANUALLY-WORKABLE DEVICES, PARTICULARLY FOR
OPERATING LOCKING MEANS OF SLIDING
ROOFS OF MOTOR VEHICLES
Filed Nov. 17, 1959   2 Sheets-Sheet 1

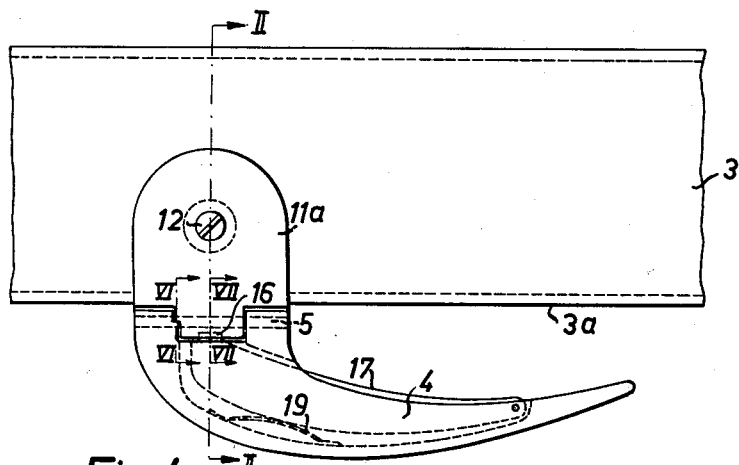
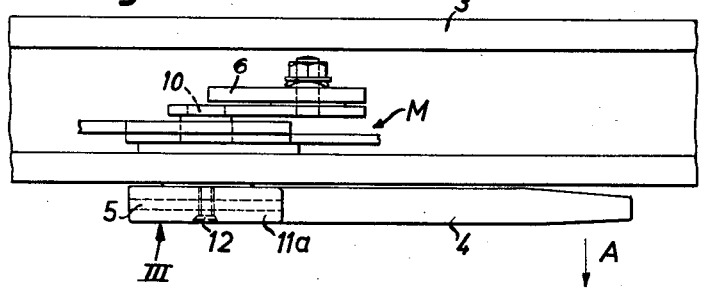
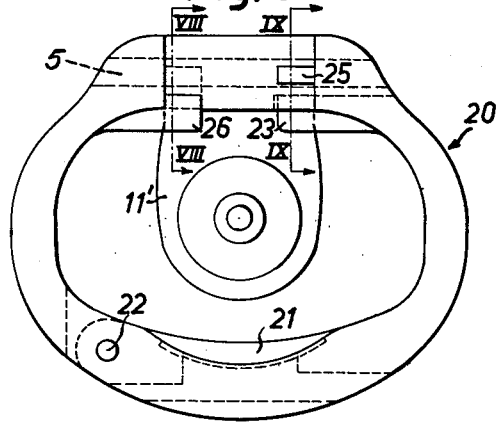
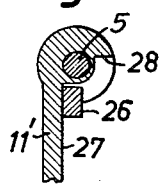
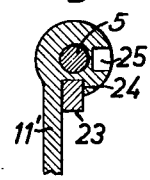

United States Patent Office 3,079,196
Patented Feb. 26, 1963

3,079,196
MANUALLY-WORKABLE DEVICES, PARTICULARLY FOR OPERATING LOCKING MEANS OF SLIDING ROOFS OF MOTOR VEHICLES
Hans Golde, Frankfurt am Main, Germany, assignor to H. T. Golde G.m.b.H. & Co. K.G., Frankfurt, Germany
Filed Nov. 17, 1959, Ser. No. 853,642
Claims priority, application Germany Nov. 19, 1958
7 Claims. (Cl. 296—137)

This invention relates to a manually workable device, particularly for operating a locking means of a sliding roof of a motor vehicle.

It is a general aim in motor vehicle construction to mount all the parts situated in the interior of a motor vehicle in such a manner as to avoid personal injury on these parts in the case of accidents and sharp braking. This involves so mounting the handle for operating the lock of the sliding roof that the handle projects as little as possible into the interior of the vehicle, i.e. that the available head room is not decreased by the handle. In this connection, it is known for the handle to be arranged in a recess or made foldable, so that the overall height then corresponds to the height of the lock itself mounted in the front strut of the sliding roof plus the height of the handle hub fixed to the lock pivot pin.

According to the present invention, there is provided a manually workable device, particularly for operating a locking means for a sliding roof of a motor vehicle, comprising a pin turnable about its axis, means at one end of said pin for connecting the pin to a means to be operated, a handle hub part rotatable about said axis, portions of said handle hub part defining a recess in which the other end of said pin is accommodated, means joining fast said portions, on the one hand, and said other end, on the other hand, and a handle grip part provided on said handle hub part for manual turning about said axis whereby to turn said pin.

Figure 1:
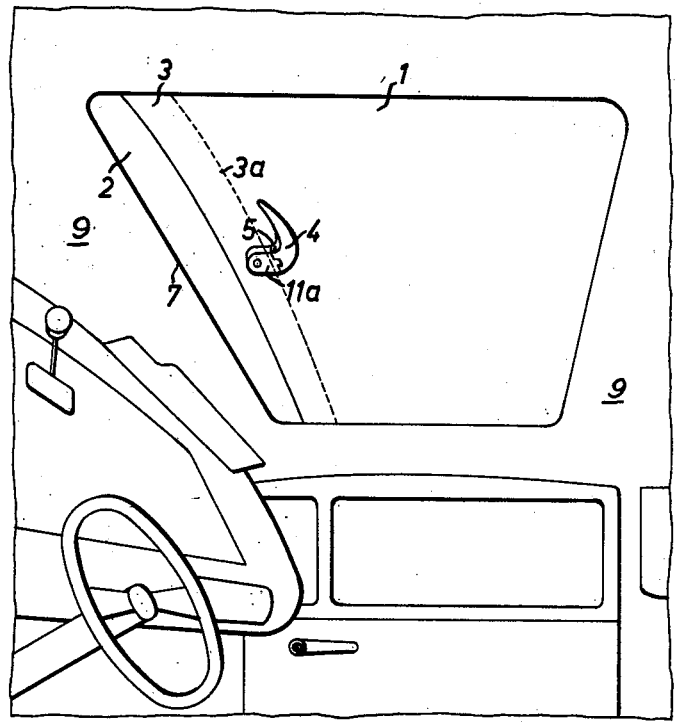
Figure 2:
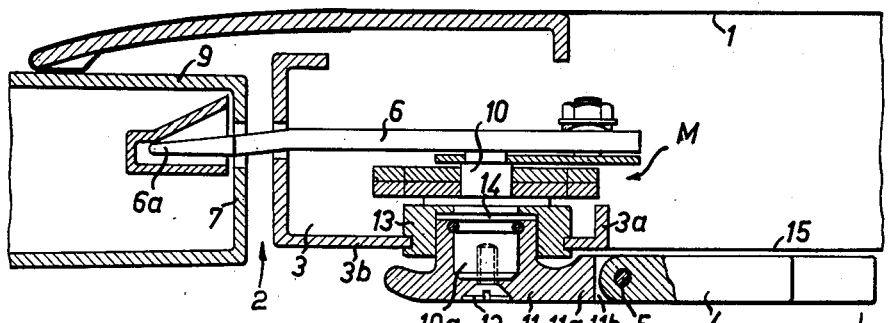
Figure 6:
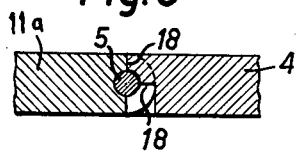
Figure 7:
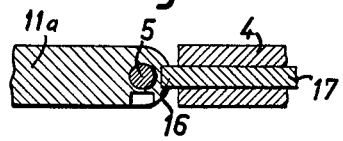

In order that the invention may be clearly understood and readily carried into effect, reference will now be made, by way of example, to the accompanying drawings, in which:

FIGURE 1 shows a diagrammatic, perspective view of the interior of a motor vehicle having a sliding roof part, FIGURE 2 is a longitudinal, vertical, sectional view, taken mainly on the line II—II in FIGURE 3, through a manually workable device for operating a locking means of the sliding roof part, FIGURE 3 is a view, from below, of part of the device, and is taken in the direction of the arrow III in FIGURE 4, FIGURE 4 is a rear view of the device, FIGURE 5 is a view similar to FIGURE 3 of a modified version of that part of the device, FIGURE 6 shows a section taken on the line VI—VI in FIGURE 3, FIGURE 7 shows a section taken on the line VII—VII in FIGURE 3, FIGURE 8 shows a section taken on the line VIII—VIII in FIGURE 5, and FIGURE 9 shows a section taken on the line IX—IX in FIGURE 5.

The motor vehicle includes a fixed roof part 9 having formed therein an opening or aperture 2, and also includes the sliding roof part 1 which is movable, in the longitudinal direction of the vehicle roof, between a closed position, in which the part 1 closes the aperture 2, and an open position, in which the aperture 2 is open. The sliding roof has a front transverse member 3 of channel-like cross-section, which member carries the manually workable device M. The rear edge of the member 3 is designated 3a.

The device M includes a pin 10 turnable about the axis thereof and a locking arm 6 connected with the upper end of the pin 10 and operable by turning of the pin about the axis. The arm 6 is formed with a hooked end 6a and, when locking the part 1 in position, extends through apertures in the member 3 and in the adjacent portion 7 of the fixed roof part 9, the hooked end 6a being engaged about the portion 7. A handle is arranged to be turnable about the axis of the pin and consists of a hub part 11 and a curved grip part 4 hinged together by a hinge pin 5. The hub part 11 is connected directly to the lower end 10a of the pin 10, whereby turning of the handle about the axis of the pin 10 causes the operation of the locking arm 6. The part 11 is rotatably mounted in an annular bearing member 13 fixed in a hole formed in a roughly horizontal flange 3b of the front transverse member 3.

In the drawings, the grip part 4 is shown in an inoperable position in which the part 4 lies flat beside a lining 15 of the sliding roof part 1. By swinging the part 4 downwardly and forwardly about the pin 5, i.e. in the direction of the arrow A in FIGURES 2 and 4 the part 4 can be brought into an operable position in which it is angularly displaced by substantially 90° from the inoperable position shown.

In order to positively connect the hub 11 and the pin 10, the lower end 10a of the pin 10 is, for example, formed with teeth, or made of square cross-section, wherewith it engages in a co-operating recess in the hub 11. In addition, a screw 12 extends through a hole in the hub and engages in an internally screw-threaded bore in the end 10a. The member 13 has an annular flange which projects radially inwards and which fits underneath an annular flange provided on the pin 10, whereby vertical movement of the pin 10 relative to the bearing member 13 is prevented. The thickest portion 11a of the hub 11 is not thicker than the handle 4. A spacing washer 14 is provided around the pin 10, and located between the hub part 11 and the bearing member 13. The ends of the hinge pin 5 are mounted in respective flanges 11b of the hub portion 11a. If necessary, the lining 15 can be slightly inwardly curved adjacent the part 4 and can, moreover, be protected by a metal or plastic plate. In order to permit comfortable manipulation of the handle, the device is preferably so constructed that operation of the locking arm 6 is effected by rotation of the handle through 180°. Since the handle is also used for aiding displacement of the part 1 backwards or forwards, a latch means must be provided to retain the handle in the operative position until such backward or forward displacement is completed. This latch means, in contrast to the known ball-type latch means, cannot disengage unaided.

Adjacent the pin 5, two abutment surfaces 18 are formed on the part 4 and a further two abutment surfaces are formed on the part 11 to co-operate with the respective surfaces 18 so as to limit the swinging movement of the part 4 between the operable and inoperable positions. As shown in FIGURES 3 and 7, a latch pin 16 is provided on one end of a latch member 17 which is mounted in the grip part 4 and is pivotable about its other end. A spring 19 mounted in the part 4 biases the latch pin 16 towards the hub part 11. When the handle part 4 is in the inoperable position shown, the latch pin 16 engages in a suitably-positioned notch in the hub 11 and so maintain the part 4 in the inoperable position. To enable an operator to move the handle part 4 into the operable position, the operator must firstly depress the latch member 17 in opposition to the spring 19, so that the pin 16 leaves the above-mentioned notch, whereafter the handle can be swung into the operable position, in which one surface 18 abuts the co-operating abutment surface of the hub 11. Release of the member 17 then allows the latch pin 16 to move into and engage in another suitably-positioned notch in the hub 11, so that the part 4 is retained in the operable position until the operator wishes to fold the part 4 back into the inoperable position. To do that, the operator then again depresses the member 17 to disengage the pin 16 from the last-mentioned notch, swings the grip part about the pin 5 until the inoperative position is reached, the other surface 18 abutting the relevant co-operating surface of the part 11, and releases the member 17 to allow the pin 16 to re-engage in the first-mentioned notch.

FIGURE 5 shows a handle consisting of a hub part 11' and a grip part 20 connected by hinge pin 5, the part 20 being constructed symmetrically and in the form of a ring. Similarly to the embodiment first described, a latch member 21, which generally follows the shape of the part 20 is provided at one end with a latch pin 23 and is mounted at the other end so as to be rockable about a pivot 22 fixed in the part 20. The pin 23 can engage in either one of two notches 24 and 25 in dependence on whether the part 20 is in the operative position, or the inoperative position shown. It will be appreciated that the notches 24 and 25 are formed in the hub 11'. A nose 26 is arranged on the part 20 symmetrically to that end of the member 21 provided with the pin 23. The nose 26 is rigid with the part 20 and projects into a recess having end walls 27 and 28 which are angularly spaced through 90° one relative to the other, and against which respective surfaces of the nose 26 abut to limit the swinging movement of the part 20 about the hinge pin connecting the parts 11' and 20.

In both embodiments shown, the axis of folding of the handle avoids the axis of the pivot pin 10. Moreover, each embodiment gives the advantage that, whilst in the inoperable position, the handle can be housed in a recess (not shown) which need only be slightly larger than the handle itself, and which does not hinder rotation of the handle when the latter is in the operable position. The arrangement of the device is such that the handle grip part, when in the inoperative position, lies beside the lining 15 of the sliding roof and it will be appreciated that this is particularly advantageous, since the lining is sufficiently yieldable to permit reliable gripping of the handle.

Owing to the fact that the axis of the pin 10 and the folding axis of the handle avoid one another, it is possible to have simple connections, in this case the screw between the pin 10 and the hub part, and the hinge pin 5 between the handle hub part and the handle grip part.

The present device is not restricted to use in connection with sliding roofs of motor vehicles, but can also be used, if necessary in a modified form, in connection with the doors and the sliding windows of motor vehicles.

I claim:

1. A vehicle roof comprising a fixed roof part, portions of said fixed roof part defining an opening therein, a sliding roof part displaceable in the longitudinal direction of the vehicle roof between positions covering and uncovering said opening, a front transverse member forming part of said sliding roof part, substantially horizontal lower portions of said transverse member defining a bearing member with a recess therein, a pin rotatably journaled in said bearing recess and passing substantially vertically and approximately in the direction of thickness of said sliding roof part, the bottom end of said pin being mounted within said bearing recess, extending slightly beyond said lower portions and comprising portions defining a substantially co-axial screw-threaded bore, a handle hub part mounted in said bearing recess rotatable together with said pin within said bearing recess, portions of said handle hub part defining a recess therein and receiving said bottom end of the pin, said bearing recess substantially surrounding both said bottom end of the pin and said recessed portions of the handle hub part, further portions of the latter defining a hole therethrough co-axial with said bore, a fastening member extending through said hole and into said bore, portions of said fastening member being provided with external screw-threads engaging in said bore, the combination of said fastening member portions, said bottom end of the pin, said recessed portions of the handle hub part, said bearing recess and said lower portions of the transverse member forming a substantially concentric and compact actuating mechanism, a head portion of said fastening member being accessible from within the vehicle for assembling and disassembling said handle hub part with and from said sliding roof part, respectively, locking means on said sliding roof part extending to a location adjacent the forward edge of said opening, means connecting said locking means eccentrically with the top end of said pin so that said locking means will be operated by rotating said pin, engagement means connected to said fixed roof part and provided near said location for cooperation with said locking means to maintain said sliding roof part in said covering position, and a handle grip part pivotally mounted on said handle hub part for manually turning the latter together with said pin for simultaneous rotation therewith, the pivotal axis of said handle grip part being located substantially at the same height as said head portion of the fastening member.

2. A vehicle roof as described in claim 1, wherein said handle grip part is connected to said handle hub part for swinging between an inoperable and an operable position, said pivotal axis around which said handle grip part is swingable being substantially parallel to the main axis in which said handle grip part is manually gripped when turning said handle hub part about said pivotal axis.

3. A vehicle roof as described in claim 2, wherein said pivotal axis is substantially at right angles to said pin and falls within a vertical plane parallel to but spaced apart from said substantially vertical pin.

4. A vehicle roof as described in claim 3, wherein said sliding roof part comprises an interior lining, and wherein said handle grip part lies substantially parallel to said lining when in its inoperable position, while said handle grip part, when swung into its operable position, stands at a location away from said lining and angularly displaced by about 90 degrees from said inoperable position.

5. A vehicle roof as described in claim 2, wherein portions of said handle hub part and said handle grip part provide cooperating abutment surfaces adapted to limit the swinging movement of said handle grip part, further comprising portions of said handle hub part defining therein two notches, one in the region of said operable position and the other in the region of said inoperable position of said handle grip part, and latch means attached to said handle grip part and including a latch member, a pin at one end of said latch member for pivoting said latch member to said handle grip part, a latch pin at the other end of said latch member for engaging either one of said notches in dependence on whether the grip part is in the operable or the inoperable position, and a spring bearing on said latch member for causing engagement of said latch pin in said notches.

6. A vehicle roof as described in claim 5, wherein said handle grip part extends laterally from said substantially vertical pin, said latch member is received in a recess of said handle grip part and attached thereto with its end remote from said pin, said abutment surfaces of the handle grip part are formed as wall portions spaced at about right angles, and wherein one of said wall portions abuts against a respective portion of said handle hub part when said latch pin engages a respective one of said notches in said operative and inoperative positions.

7. A vehicle roof as described in claim 5, wherein said handle grip part has the shape of a ring, said main gripping axis traverses said ring as one of its chords, and is substantially at the same height as said head portion of the fastening member when said handle grip part is in said inoperable position, said latch member is received in a recess of said handle grip part, said abutment surfaces of the handle hub part are formed as wall portions spaced at about right angles, and wherein said abutment surfaces of the handle grip part include a nose on the side of said handle grip part opposite said latch pin of the latch member, said nose abutting against one of said wall portions when said latch pin engages a respective one of said notches in said operative and inoperative positions.

References Cited in the file of this patent

UNITED STATES PATENTS

| | | |
|---|---|---|
| 248,474 | Kells | Oct. 18, 1881 |
| 579,277 | Lord et al. | Mar. 23, 1897 |
| 968,894 | Teppert | Aug. 30, 1910 |
| 1,165,493 | Clark | Dec. 28, 1915 |
| 1,421,624 | Waits | July 4, 1922 |
| 2,208,818 | Shaffler | July 23, 1940 |
| 2,242,844 | Baier et al. | May 20, 1941 |

FOREIGN PATENTS

| | | |
|---|---|---|
| 6,703 | Great Britain | Mar. 19, 1902 |
| 527,255 | Great Britain | Oct. 4, 1940 |
| 798,420 | Great Britain | July 23, 1958 |
| 820,352 | Great Britain | Sept. 16, 1959 |
| 543,227 | Italy | May 18, 1956 |